(12) United States Patent
Schumacher et al.

(10) Patent No.: US 10,926,610 B2
(45) Date of Patent: Feb. 23, 2021

(54) METHODS AND SYSTEMS FOR CONTROLLING A MILD HYBRID SYSTEM THAT POWERS A TRANSPORT CLIMATE CONTROL SYSTEM

(71) Applicant: THERMO KING CORPORATION, Minneapolis, MN (US)

(72) Inventors: Ryan Wayne Schumacher, Bloomington, MN (US); Matthew Srnec, Minnetonka, MN (US)

(73) Assignee: Thermo King Corporation, Minneapolis, MN (US)

( * ) Notice: Subject to any disclaimer, the term of this patent is extended or adjusted under 35 U.S.C. 154(b) by 82 days.

(21) Appl. No.: 16/176,802

(22) Filed: Oct. 31, 2018

(65) Prior Publication Data
US 2020/0130473 A1    Apr. 30, 2020

(51) Int. Cl.
*B60H 1/32* (2006.01)
*B60L 1/00* (2006.01)
*B60L 50/51* (2019.01)

(52) U.S. Cl.
CPC ............ *B60H 1/3232* (2013.01); *B60L 1/003* (2013.01); *B60L 50/51* (2019.02); *B60L 2210/12* (2013.01);
(Continued)

(58) Field of Classification Search
CPC ....... B60H 1/3232; B60L 1/003; B60L 50/51; B60L 2210/12; B60L 2210/20; B60L 2210/30; B60L 2210/42
See application file for complete search history.

(56) References Cited

U.S. PATENT DOCUMENTS 3,875,483 A * 4/1975 Farr .................. F25B 49/025
318/807
5,104,037 A   4/1992 Karg et al.
(Continued)

FOREIGN PATENT DOCUMENTS

CN    2456117    10/2001
CN    1885660    12/2006
(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.
(Continued)

*Primary Examiner* — Marc E Norman
(74) *Attorney, Agent, or Firm* — Hamre, Schumann, Mueller & Larson, P.C.

(57) ABSTRACT

Methods and systems for controlling energy source for a mild hybrid system that powers a transport climate control system are provided. The mild hybrid system includes a DC energy source configured to supply a first DC voltage to the transport climate control system. The system also includes an inverter connected to the DC energy source and configured to change the first DC voltage from the DC energy source to a first AC voltage. The system further includes a transformer connected to the inverter and configured to convert the first AC voltage to a second AC voltage. Also the system includes a motor that drives a compressor. The motor is driven by the second AC voltage, the second AC voltage is greater than the first AC voltage.

15 Claims, 9 Drawing Sheets

(52) U.S. Cl.
CPC ....... *B60L 2210/20* (2013.01); *B60L 2210/30* (2013.01); *B60L 2210/42* (2013.01)

(56) References Cited

U.S. PATENT DOCUMENTS

| | | | |
|---|---|---|---|
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,688,125 B2 | 2/2004 | Okamoto et al. |
| 6,753,692 B2 | 6/2004 | Toyomura et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,760,115 B2 | 6/2014 | Kinser et al. |
| 8,764,469 B2 | 7/2014 | Lamb |
| 8,818,588 B2 | 8/2014 | Ambrosio et al. |
| 8,862,356 B2 | 10/2014 | Miller |
| 8,924,057 B2 | 12/2014 | Kinser et al. |
| 8,978,798 B2 | 3/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1* | 3/2019 | Thomas, Jr. .......... F25D 11/003 |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2005/0057210 A1 | 3/2005 | Ueda et al. |
| 2006/0284601 A1 | 12/2006 | Salasoo et al. |
| 2007/0052241 A1 | 3/2007 | Pacy |
| 2007/0131408 A1 | 6/2007 | Zeigler et al. |
| 2007/0192116 A1 | 8/2007 | Levitt |
| 2008/0023965 A1 | 1/2008 | Cagliari et al. |
| 2009/0121798 A1 | 5/2009 | Levinson |
| 2009/0126901 A1 | 5/2009 | Hegar et al. |
| 2009/0178424 A1 | 7/2009 | Hwang et al. |
| 2009/0229288 A1 | 9/2009 | Alston et al. |
| 2009/0314019 A1 | 12/2009 | Fujimoto et al. |
| 2009/0320515 A1 | 12/2009 | Bischofberger et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0208378 A1* | 8/2011 | Krueger ................ B60W 10/06 701/22 |
| 2011/0224841 A1 | 9/2011 | Profitt-Brown et al. |
| 2011/0241420 A1 | 10/2011 | Hering et al. |
| 2012/0000212 A1 | 1/2012 | Sanders et al. |
| 2012/0116931 A1 | 5/2012 | Meyers |
| 2012/0198866 A1 | 8/2012 | Zeidner |
| 2013/0000342 A1 | 1/2013 | Blasko et al. |
| 2013/0088900 A1 | 4/2013 | Park |
| 2013/0158828 A1 | 6/2013 | McAlister |
| 2013/0231808 A1 | 9/2013 | Flath et al. |
| 2014/0026599 A1 | 1/2014 | Rusignuolo et al. |
| 2014/0060097 A1 | 3/2014 | Perreault |
| 2014/0265560 A1 | 9/2014 | Leehey et al. |
| 2015/0081212 A1 | 3/2015 | Mitchell et al. |
| 2015/0188360 A1 | 7/2015 | Doane et al. |
| 2015/0231948 A1 | 8/2015 | Kennedy |
| 2015/0246593 A1 | 9/2015 | Larson et al. |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0280040 A1 | 9/2016 | Connell et al. |
| 2016/0285416 A1 | 9/2016 | Tiwari et al. |
| 2017/0030728 A1 | 2/2017 | Baglino et al. |
| 2017/0057323 A1 | 3/2017 | Neu et al. |
| 2017/0063248 A1* | 3/2017 | Lee ........................ F24F 1/20 |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1* | 10/2017 | Marcinkiewicz ....... H02M 1/44 |
| 2017/0349078 A1 | 12/2017 | Dziuba et al. |
| 2018/0029436 A1 | 2/2018 | Zaeri et al. |
| 2018/0029488 A1 | 2/2018 | Sjödin |
| 2018/0111441 A1 | 4/2018 | Menard et al. |
| 2018/0154723 A1 | 6/2018 | Anderson et al. |
| 2018/0170398 A1 | 6/2018 | Miller et al. |
| 2018/0201092 A1 | 7/2018 | Ahhuja et al. |
| 2018/0203443 A1 | 7/2018 | Newman |
| 2018/0222278 A1 | 8/2018 | Mizuma |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0092122 A1 | 3/2019 | Vanous et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0086712 A1 | 3/2020 | Schumacher et al. |

(56) References Cited

U.S. PATENT DOCUMENTS

| | | | |
|---|---|---|---|
| 2020/0086744 A1 | 3/2020 | Schumacher et al. | |
| 2020/0101818 A1 | 4/2020 | Holmstrom et al. | |
| 2020/0101820 A1 | 4/2020 | Wenger et al. | |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 14539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 3536552 | 9/2019 |
| EP | 3540340 | 9/2019 |
| GB | 2551999 | 1/2018 |
| JP | 2000-158930 | 6/2000 |
| JP | 2007-320352 | 12/2007 |
| JP | 2009-243780 | 10/2009 |
| JP | 2019-145521 | 8/2019 |
| KR | 10-2012-0092834 | 8/2012 |
| WO | 03038988 | 5/2003 |
| WO | 2011066468 | 6/2011 |
| WO | 2012/138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/009798 | 1/2018 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018/204591 | 11/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/235,865, titled "Methods and Systems for Preserving Autonomous Operation of a Transport Climate Control System", filed Dec. 28, 2018, 50 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/147,708, titled "Methods and Systems for Autonomous Climate Control Optimization of a Transport Vehicle", filed Sep. 29, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/565,110, titled "Transport Climate Control System With a Self-Configuring Matrix Power Converter", filed Sep. 9, 2019, 52 pages.

(56) References Cited

OTHER PUBLICATIONS

U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
Extended European Search Report, issued in the corresponding European patent application No. EP 19205724.8, dated Mar. 30, 2020, 7 pages.

\* cited by examiner

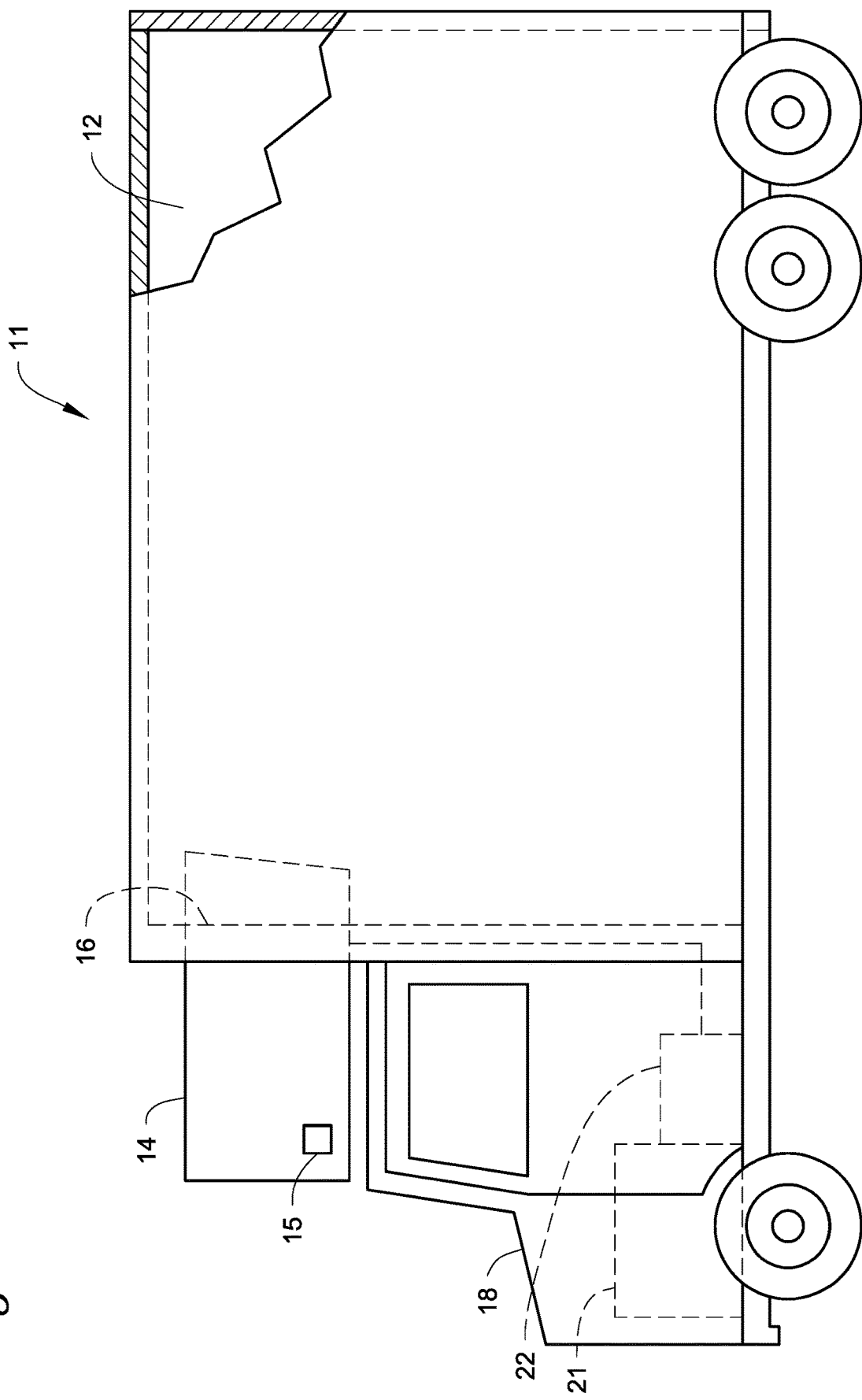

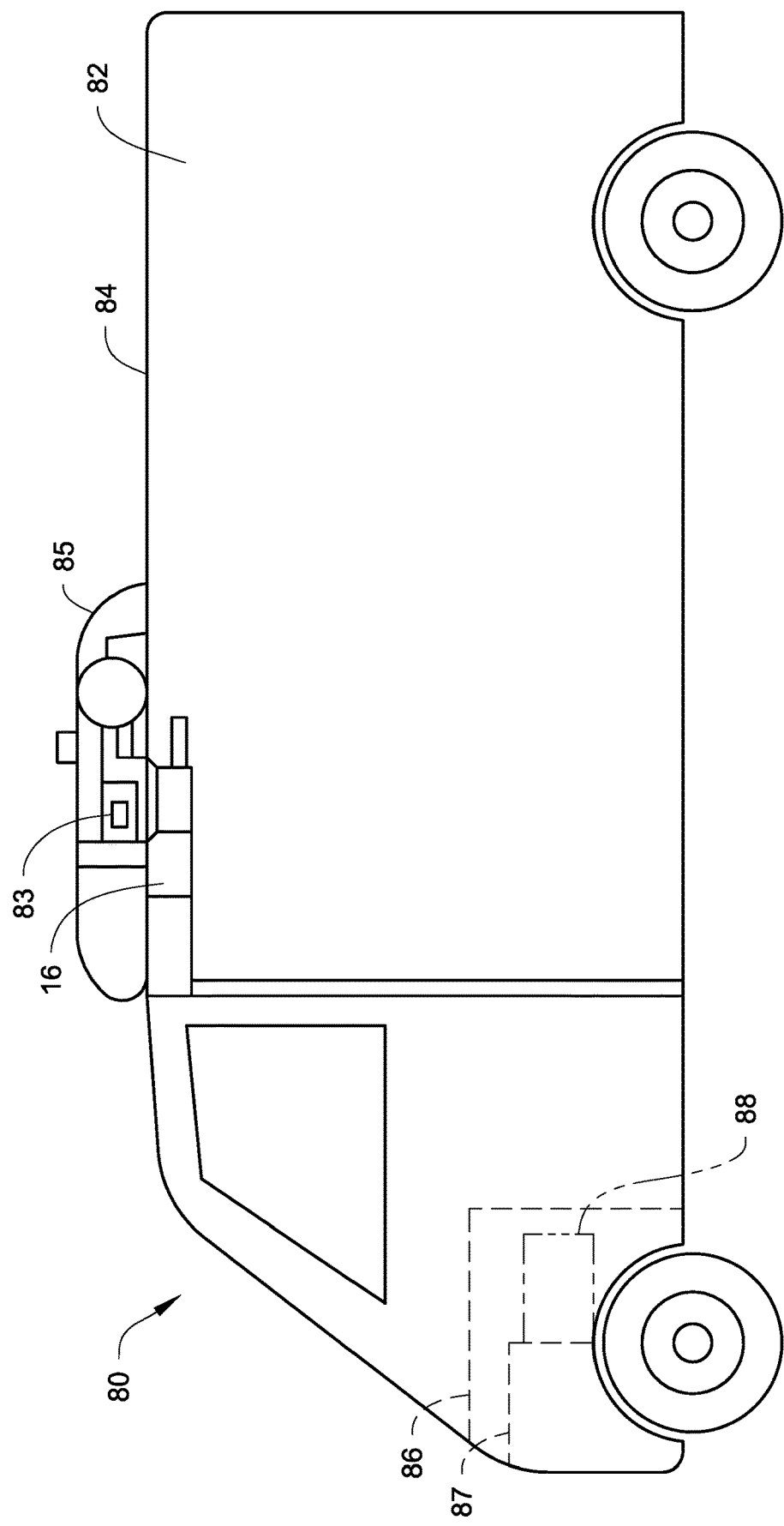

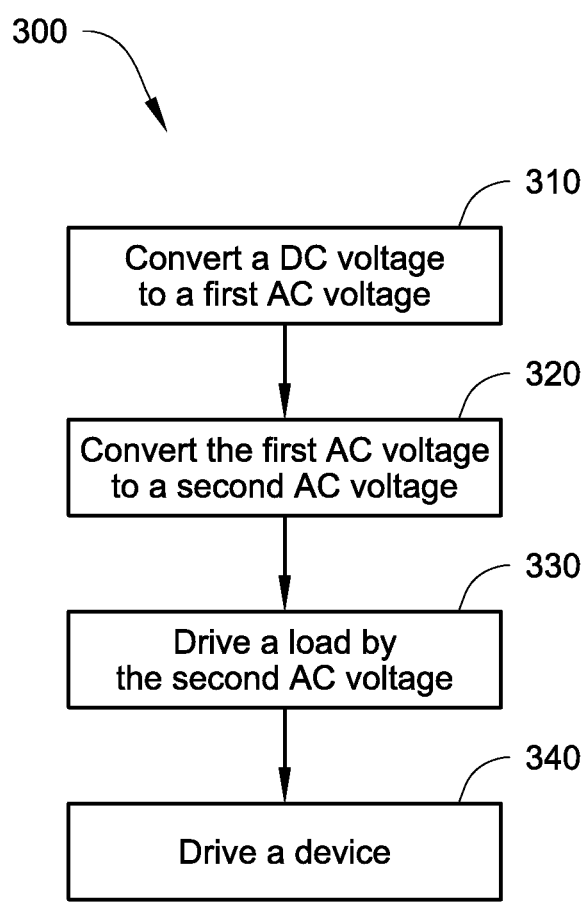

US 10,926,610 B2

METHODS AND SYSTEMS FOR CONTROLLING A MILD HYBRID SYSTEM THAT POWERS A TRANSPORT CLIMATE CONTROL SYSTEM

FIELD

This disclosure relates generally to energy source management for powering a transport climate control system. More specifically, the disclosure relates to methods and systems for managing and controlling a mild hybrid system that powers a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

Regulations to reduce emissions (e.g., particulate matter emissions, nitrogen oxide emissions, noise emissions, etc.), for example, from a vehicle prime mover (e.g., a combustion engine such as a diesel engine, etc.), have led to components within the vehicle being electrically driven and the addition of emission reducing components (e.g., emission control devices, an auto start-stop system, etc.) in the space between the vehicle alternator and the prime mover within a vehicle power bay. As such, utility power (shore power) is used more often to charge and/or power the electrified components. For a transport climate control system, factory standard electric standby options (such as 230V/460V motor, etc.) are used frequently to work together with the utility power. Electrification requirements also lead to more usage of a battery pack (e.g., 24V/48V battery pack). High voltage battery packs that match the voltage requirements of the factory standard electric standby options can be cost prohibitive. The embodiments disclosed herein provide a cost effective design to control an energy source for a mild hybrid system that powers a transport climate control system. The mild hybrid system can address issues such as incompatibility of the voltages (e.g., the voltage of the battery pack and the voltage required for a factory standard electric motor, etc.).

In one embodiment, a mild hybrid system for a transport climate control system is provided. The mild hybrid system includes a DC energy source configured to supply a first DC voltage to the transport climate control system. The system also includes an inverter connected to the DC energy source and configured to change the first DC voltage from the DC energy source to a first AC voltage. The system further includes a transformer connected to the inverter and configured to convert the first AC voltage to a second AC voltage. Also the system includes a motor that drives a compressor. The motor is driven by the second AC voltage, the second AC voltage is greater than the first AC voltage.

In another embodiment, a method for managing a mild hybrid system that powers a transport temperature control system is provided. The method includes converting, by an inverter, a DC voltage from a DC energy source to a first AC voltage. The method also includes converting, by a transformer, the first AC voltage to a second AC voltage. The second AC voltage is greater than the first AC voltage. The method further includes driving a motor by the second AC voltage. Also the method includes driving a compressor by the motor.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIG. 1A illustrates a side view of a truck with a front wall mounted vehicle powered transport refrigeration unit, according to one embodiment.

FIG. 1E illustrates a side view of a van with a roof mounted vehicle powered transport refrigeration unit, according to one embodiment.

FIG. 3 is a flow chart illustrating a method for managing a mild hybrid system that powers a transport temperature control system, according to one embodiment.

Like reference numbers represent like parts throughout.

DETAILED DESCRIPTION

Figure 1B:
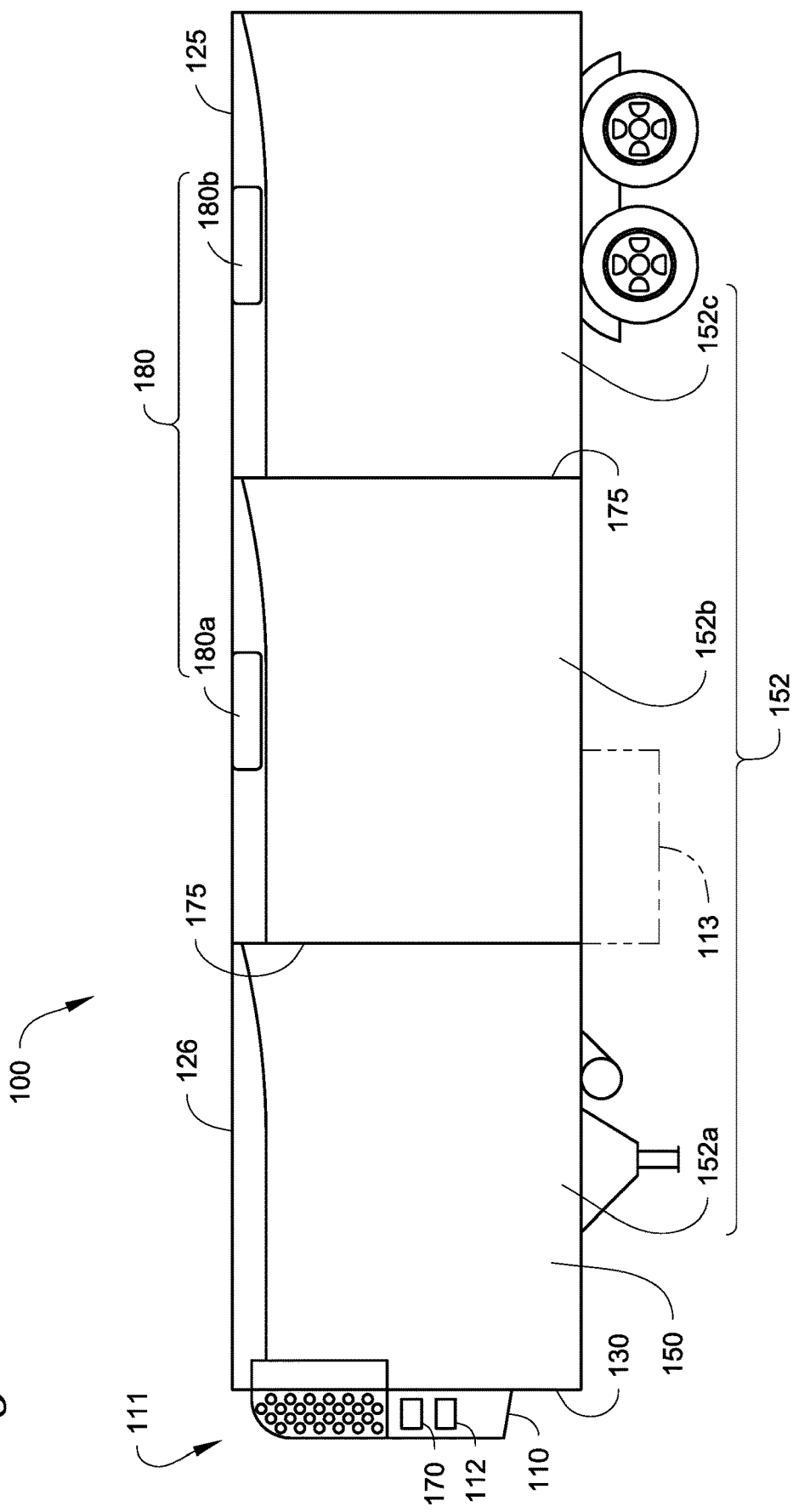
FIG. 1B illustrates a schematic cross sectional side view of a refrigerated transport unit with a multi-temp transport refrigeration system, according to one embodiment.

This disclosure relates generally to energy source management for powering a transport climate control system. More specifically, the disclosure relates to methods and systems for managing and controlling a mild hybrid system that powers a transport climate control system.

The embodiments disclosed herein can provide a cost effective design to control an energy source of a mild hybrid system that powers a transport climate control system.

As defined herein, the phrase "mild hybrid" refers to a hybrid system that includes an energy storage system (e.g., a rechargeable energy storage system) that is not capable of providing sufficient energy/power to support operation of the transport climate control system at full capacity by itself.

As defined herein, the phrase "full hybrid" refers to a hybrid system that includes an energy storage system (e.g., a rechargeable energy storage system) that may be capable of providing sufficient energy/power to support operation of the transport climate control system at full capacity by itself.

The embodiments described herein can provide an energy system in which a voltage of a battery pack requires a boost to match the voltage requirements of, for example, factory standard electric standby options.

FIG. 1A depicts a temperature-controlled straight truck 11 that includes a conditioned load space 12 for carrying cargo. A transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In one embodiment, the TRU 14 includes a vehicle electrical system. Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source). While FIG. 1A illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

FIG. 1B illustrates one embodiment of a MTRS 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1B, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. In some embodiments, an HVAC system can be powered by an Auxiliary Power Unit (APU, see FIGS. 1C and 1D). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MTRS 100, and/or the TU 125.

Figure 1C:
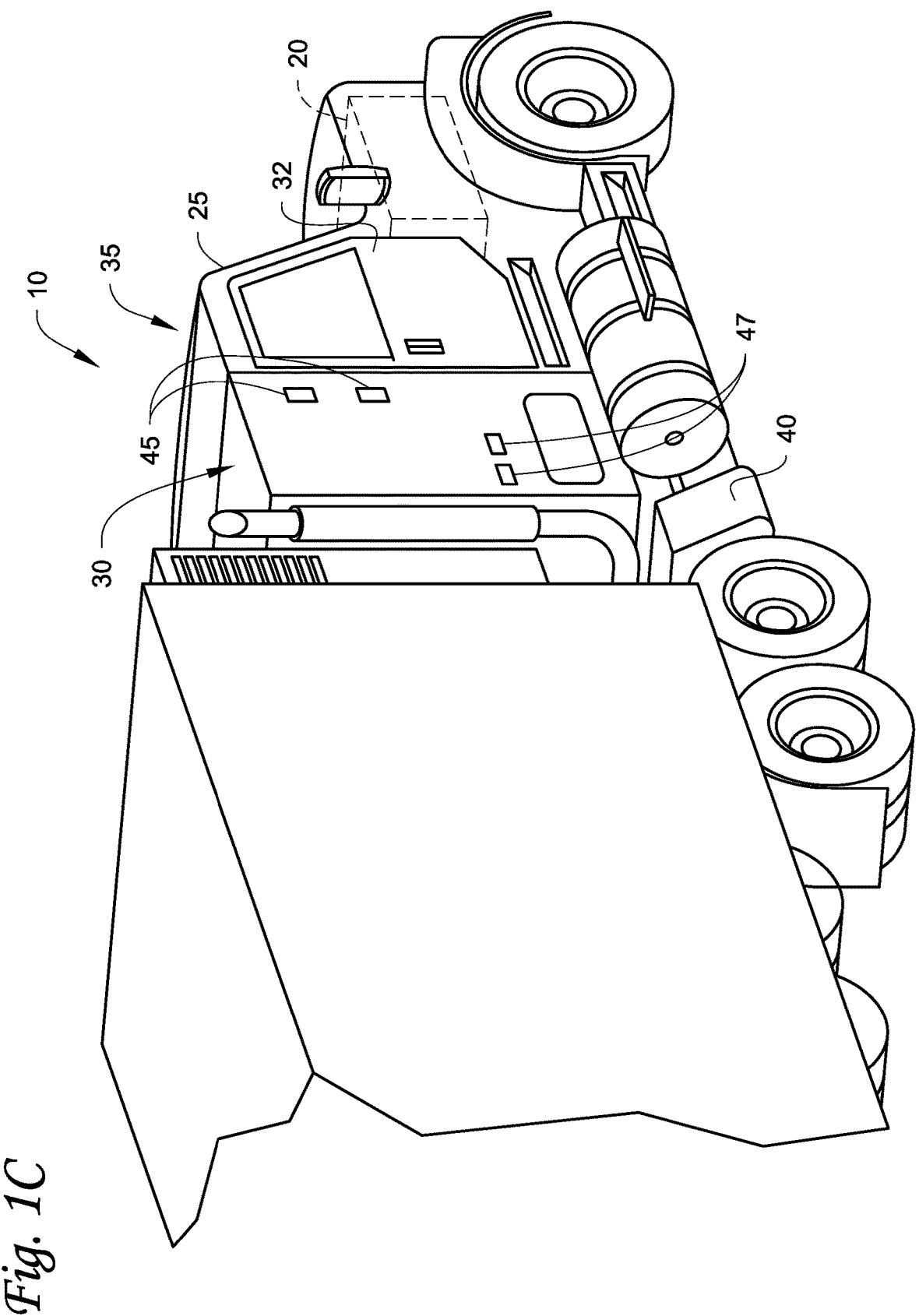
FIG. 1C illustrates a perspective view of a vehicle with an APU, according to one embodiment.

FIG. 1C illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/ windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41.

Figure 1D:
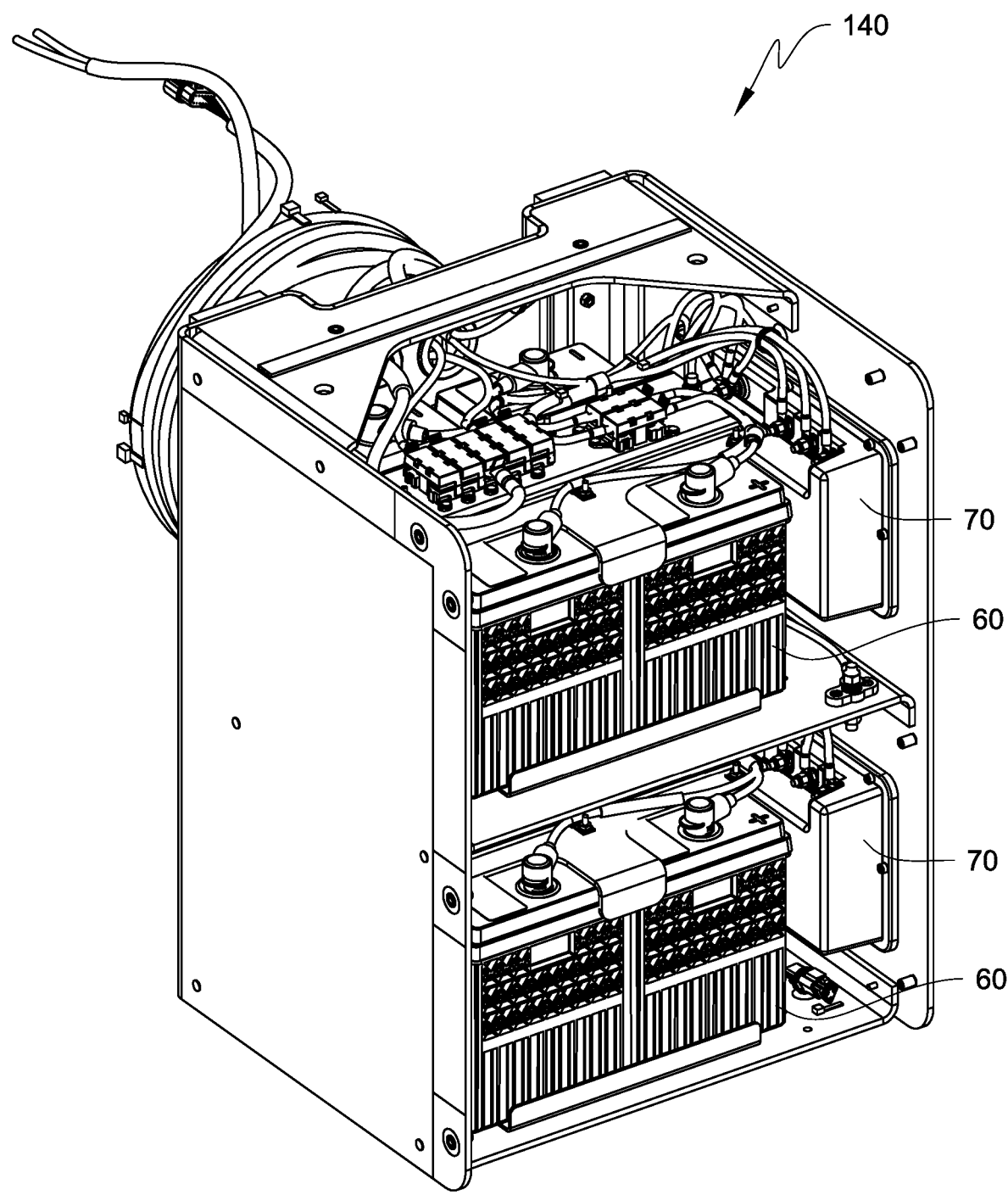
FIG. 1D illustrates a front perspective view of an APU, according to one embodiment.

FIG. 1D illustrates an electric APU 140 that can be used with a vehicle (e.g., the vehicle 10 shown in FIG. 1C), according to one embodiment. The APU 140 includes a plurality of energy storage elements 60 each of which is coupled to one of a plurality of converters 70. The converters 70 can provide electric power (e.g., AC or DC power) generated by the APU 140 to one or more vehicle accessory components, cabin accessory components, a primary HVAC system, and a secondary HVAC system. A secondary HVAC system can provide conditioned air to a sleeping portion of a vehicle cabin (e.g., the sleeping portion 30 of the cabin 25 shown in FIG. 1C). The energy storage elements 60 can be, for example, battery packs, fuel cells, etc. In some embodiments, the APU 140 can be turned on or off by an occupant (e.g., driver or passenger) of the vehicle. For example, the occupant can turn on the APU 140 to provide power stored in the energy storage elements 60 when a primary power source of the vehicle is turned off. It will be appreciated that the embodiments described herein can also be used with a prime mover powered APU.

In some embodiments, the APU (e.g., the APU 40 as shown in FIG. 1C and/or the APU 140 as shown in FIG. 1D) includes a vehicle electrical system.

FIG. 1E depicts a temperature-controlled van 80 that includes a conditioned load space 82 (or internal space) for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In one embodiment, the TRU 85 includes a vehicle electrical system. Also, in some embodiments, the van 80 can be a hybrid vehicle that is powered by the prime mover 87 in combination with a battery power source or can be an electrically driven truck in which the prime mover 87 is replaced with an electric power source (e.g., a battery power source).

Figure 2A:
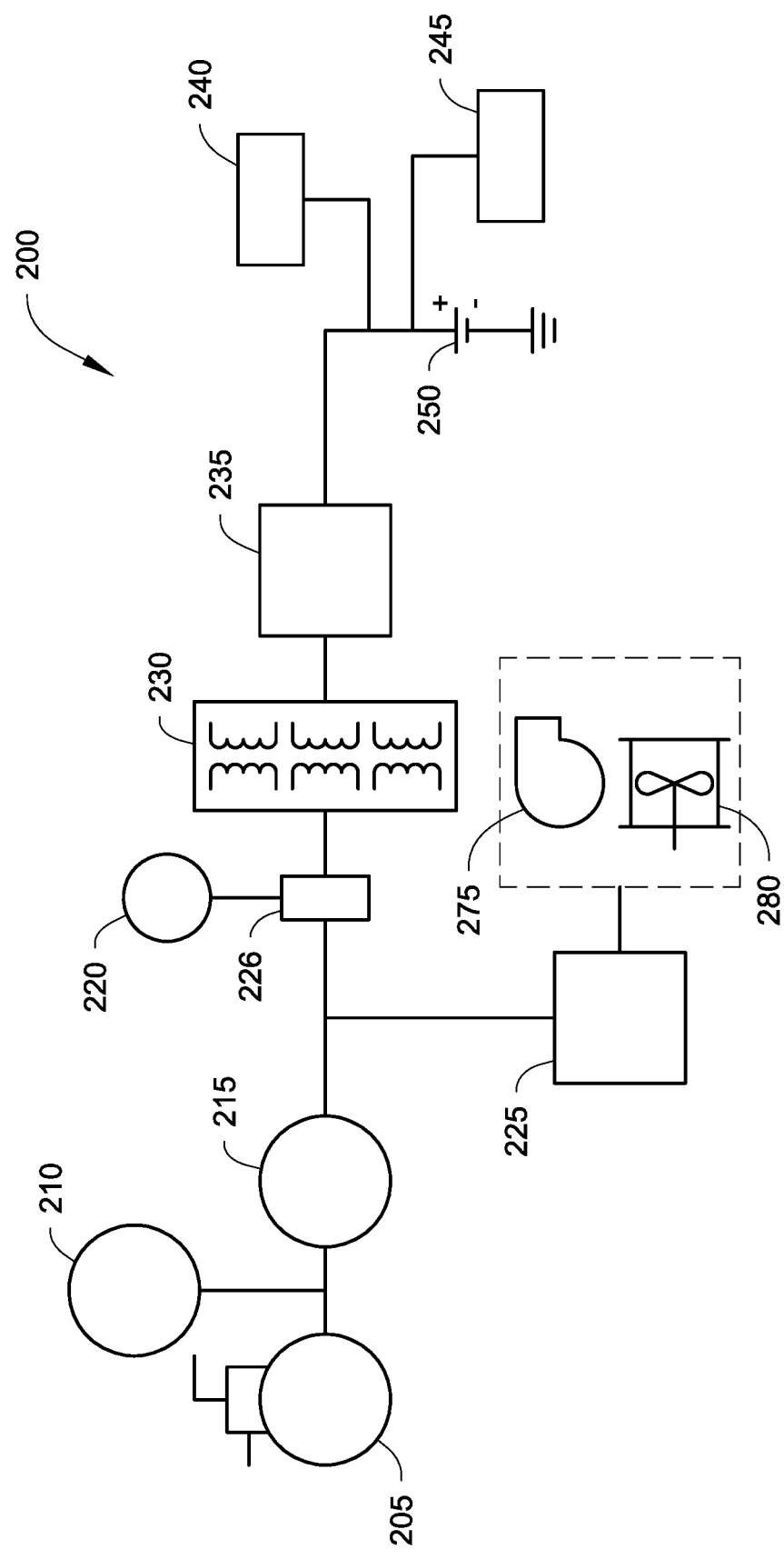
FIG. 2A illustrates a mild hybrid system for powering a transport climate control system, according to one embodiment.

FIG. 2A illustrates a mild hybrid system 200 for powering a transport climate control system, according to one embodiment. The transport climate control system can include, for example, the transport refrigeration unit/system of FIGS. 1A, 1B, and 1E. The mild hybrid system 200 can include, for example, the APU of FIGS. 1C and 1D.

A mild hybrid system generally includes a prime mover (e.g., an internal combustion engine) equipped with an electric machine (for example, a motor/generator in a parallel hybrid configuration) configured to allow the prime mover to be turned off whenever the vehicle, for example, is coasting, braking, or stopped. Mild hybrid systems, as defined herein, do not require the same level of battery power as compared to full hybrid vehicles (which have high voltage battery pack etc.). It will be appreciated that a mild hybrid system can be a lower cost implementation of hybridization approach. Lower cost typically indicates less energy storage. Less energy storage typically makes for lower voltage. As such, less power can be generated from lower cost machines. It will also be appreciated that mild hybrid system can regenerate and provide power for some portions of the operating cycle but might not fit as many as those in the full hybrid system. Full hybrid system typically has a greater quantity of energy storage and generator power available compared with a mild hybrid system. Compared with a full hybrid system, an energy storage system (e.g., a rechargeable energy storage system) of the mild hybrid system is not capable of providing sufficient energy/power to support operation of the transport climate control system at full capacity by itself.

In a mild hybrid system, the energy storage system can be low voltage battery pack(s). In some embodiments, the low voltage battery pack(s) can be rechargeable battery pack(s). The voltage of the battery pack in the mild hybrid system can be, for example, 24V, 48V, 88V, 120V, 200V, etc. Factory standard electric standby options (such as 230 VAC/460 VAC motor, etc.) are used frequently to work together with the utility power. By definition, mild hybrid is a system where the voltage of the energy storage (e.g., battery pack) requires a boost to match the voltage requirements of the electric components (e.g., factory standard electric motor) that need to be driven. For example, the voltage of the energy storage (e.g., battery pack) is 48V and the voltage requirements of the electric component (e.g., factory standard electric motor) to be driven is 230 VAC/460 VAC, the voltage of the energy storage requires a boost to drive the electric component.

High voltage (defined as a voltage that matches the voltage requirements of the electric components to be driven) energy storage can be cost prohibitive. The embodiments disclosed herein provide a cost effective design to control an energy source for a mild hybrid system. However, there are safety reasons not to use high voltage DC for powering a transport climate control system. In some embodiments, high voltage batteries are not always be available. The embodiments disclosed herein provide a cost effective design to control an energy source for a mild hybrid system.

When a low voltage battery (e.g., 48V) is provided in the transport climate control system, in some embodiments, it may be difficult to find a motor (e.g., a low voltage DC motor, such as a 48V Electrically Commutated Motor (ECM)) that can fit in a transport refrigeration unit of the transport climate control system. Factory standard electric motors (e.g., 230 VAC/460 VAC motors that match the voltage of the utility power) are typically readily available. The embodiments disclosed herein can use a drive (e.g., a 48V inverter), and boost the output of the inverter to match the voltage of a factory standard electric motor, to run, for example, the transport climate control system.

In one embodiment, low voltage (in a mild hybrid system) can refer to a voltage greater than 0 VDC but equal to or less than 144 VDC (or greater than 0 VAC but equal to or less than 100 VAC). For example, the low voltage (in a mild hybrid system) can be, for example, 12 VDC, 24 VDC, 48 VDC, etc. In some embodiments, low voltage (in a mild hybrid system) can be 250 VDC or less. It will be appreciated that there are many inverters available that operate in the 12 VDC to 144 VDC range. For example, inverters for things such as golf carts which may not have HV battery pack.

In one embodiment, voltage requirements for an AC machine can be greater than 144 VDC but less than 1200 VDC (or greater than 100 VAC but equal to or less than 1000 VAC). Such voltage requirements typically include normal utility power of 100 VAC-506 VAC (one phase or three phases). Many AC machines are made to operate from utility power. Driving such AC machines from a low voltage network using a low voltage inverter can require a transformer (or auto transformer) to get the needed voltage requirements.

As shown in FIG. 2A, the system 200 includes a compressor 205 and a motor 215 that drives the compressor 205. The motor 215 can be a factory standard electric motor, such as a 230V (or 460V) AC motor. The system 200 further includes a prime mover 210. The prime mover 210 can be an internal combustion engine (e.g., a diesel prime engine). The motor 215 is connected to the compressor 205 to drive the compressor 205. The prime mover 210 is coupled (e.g., mechanically) to the motor 215 and the compressor 205. It will be appreciated that mechanical energy flows from the prime mover 210 to the compressor 205. It will also be appreciated that there can be clutches (not shown) for disconnecting the mechanical coupling. For example, a clutch can be used to disconnect the prime mover 210 and connect the motor 215 to drive the compressor 205. In another embodiment, the motor 215 can have a jack (or through shaft, etc.). The prime mover 210 and the compressor 205 (that are linked) can be connected to one end of the jack and loads (such as fan, etc.) can be connected to the other end of the jack. It will be appreciated that if the prime mover 210 drives the compressor 205, a rotor of the motor can be spinning along as dead load.

Also the system 200 includes a socket 220. The system 200 can connect to a utility power source (not shown) via the socket 220. The utility power source can provide power to drive the motor 215. Further the system 200 includes an AC load 225. The utility power source can provide power to drive the AC load 225.

The system 200 includes an energy storage 250. The energy storage 250 can be a TRU energy storage, a vehicle energy storage, etc. In some embodiments, the energy storage 250 can be a battery pack. The battery pack can be a low voltage battery pack to provide a mild hybrid energy source (e.g., no more than 250V), for example, 24V, 48V, 88V, 120V, 200V, 250V, etc. The system 200 also includes a generator 240. The generator 240 can be, for example, a solar power source. It will be appreciated that the generator 240 can be a high voltage generator. The generator 240 can be configured to charge the energy storage 250.

The system 200 can further include an energy network 245. The energy network 245 can provide power from a vehicle power source (e.g., APU, auxiliary/holdover battery, etc.). The energy network 245 can charge the energy storage 250.

Also the system 200 includes an inverter 235 and a transformer 230. The inverter 235 can invert the DC power from the energy storage 250, the energy network 245, and/or the generator 240 to a first AC power. The transformer 230 can convert the voltage of the first AC power from the inverter 235 to a second AC voltage. The second AC voltage matches the voltage requirements of, for example, the motor 215 and/or the AC load 225. An AC power output from the transformer 230 can drive the motor 215 and/or the AC load 225.

It will be appreciated that in one embodiment when the transformer 230 converts the voltage of the first AC power from the inverter 235 to a second AC voltage, the voltage can be stepped up (e.g., to drive a machine). In another embodiment, the voltage can be stepped down (e.g., to generate power from a machine) when the transformer 230 converts the voltage of the first AC power from the inverter 235 to a second AC voltage.

The socket 220 and the transformer 230 connect to a switch 226. It will be appreciated that a controller (such as the controller of FIGS. 1A-1E) can control the switch 226 so that either power from the utility power source (via the socket 220) or power from the transformer 230 can be used to drive the motor 215 and/or the AC load 225. For example, when the controller determines (via, e.g., a sensor) that a utility power source is connected, the controller can control the switch 226 so that only power from the utility power source (via the socket 220) can be used to drive the motor 215 and/or the AC load 225. When the controller determines (via, e.g., a sensor) that a utility power source is not connected, the controller can control the switch 226 so that power from the transformer 230 can be used to drive the motor 215 and/or the AC load 225.

It will be appreciated that in one embodiment, the prime mover 210 can mechanically drive a generator (not shown). The generator can generate electrical power to drive the motor 215. The motor 215 can mechanically drive the compressor 205.

It will also be appreciated that when the transformer 230 boosts the voltage of the first AC power from the inverter 235 to a second AC voltage, the boost circuit for boosting the voltage is a "passive boost circuit". A "passive boost circuit" refers to a booster circuit that only includes passive elements. A passive element is an electrical component that does not generate power, but instead dissipates, stores, and/or releases power. Passive elements include resistors, capacitors, inductors, transformers (can increase a voltage or current but cannot increase the power), diodes (when they do not have a negative differential resistance) etc. It will also be appreciated that "passive boost circuit" means that the boost circuit does not include any active elements. Active elements are elements that supply power to the circuit. Active elements include, for example, voltage and current sources, generators, transistors, etc. For example, unlike, an active voltage boost circuit, a passive boost circuit does not include transistor(s) or MOSFET(s). In one embodiment, the passive boost circuit can include the inverter 235.

It will be appreciated that transformer(s) are not usually used in a mild hybrid system because they are big (in space), heavy (in weight), and bulky and thus cannot be easily accommodated in the mild hybrid system. In one embodiment, the transformer(s) can be mounted on/under the transport unit (e.g., the transport unit 11 shown in FIG. 1A). Despite the bulkiness of the transformer, compared with a system with a DC-DC booster and then an inverter, and a system with a boosting invertor (which can be cost prohibitive), using transformer(s) in the mild hybrid system 200 can be cost effective (e.g., no extra switches required) and efficient. The embodiments disclosed herein can match the voltage of the energy storage to the voltage requirement level of the AC machine, without the use of a DC-DC boost converter. The transformer 230 enables the voltage from the drive (e.g., the inverter 235) to be at an appropriate level when it reaches the AC machine (e.g., motor 215).

It will also be appreciated that the AC load 225 can be one or more loads of the transport climate control system including, for example, an AC evaporator fan 275, a condenser fan 280, etc.

Figure 2B:
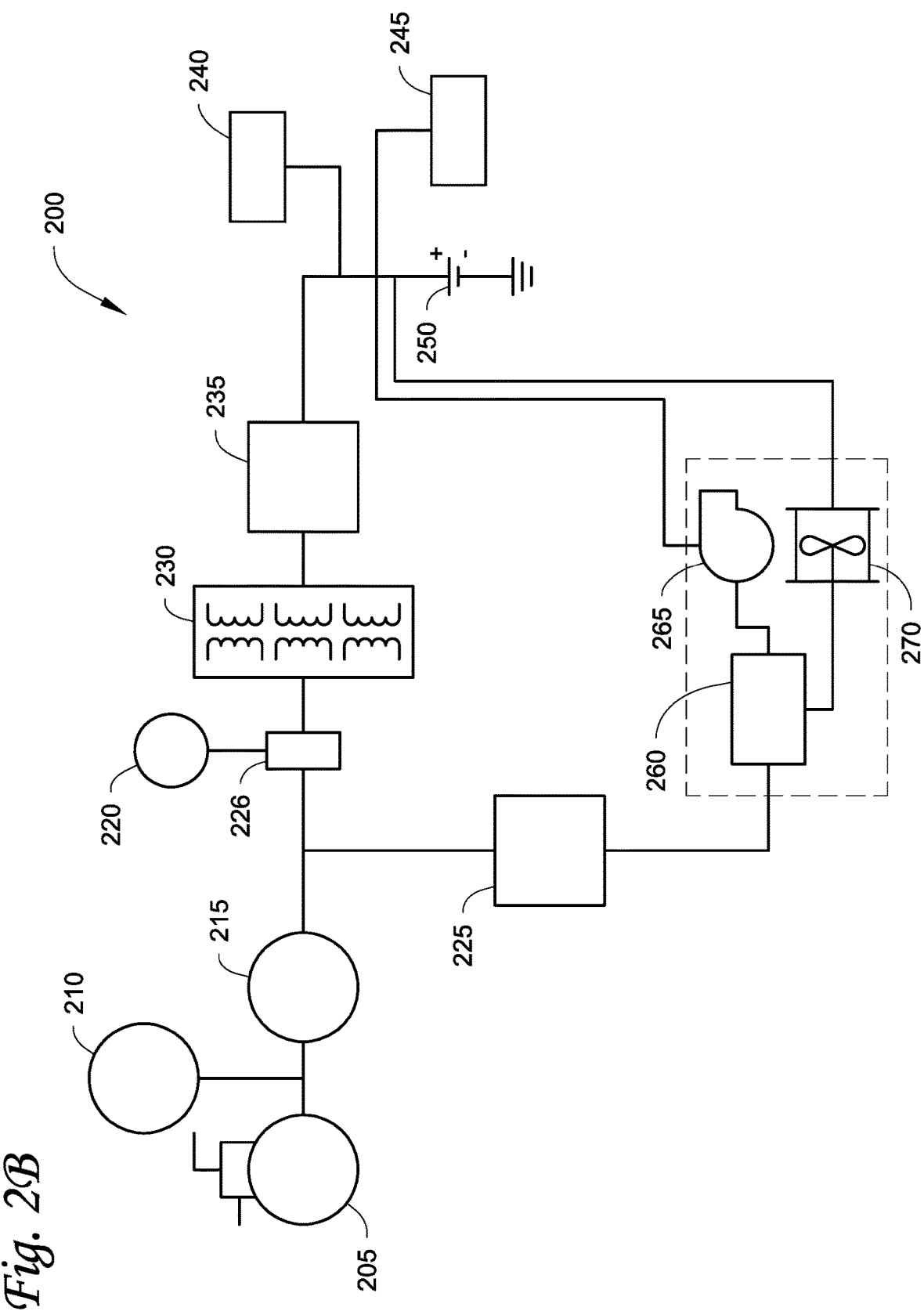
FIG. 2B illustrates a mild hybrid system for powering a transport climate control system, according to another embodiment.

FIG. 2B illustrates a mild hybrid system 200 for powering a transport climate control system, according to another embodiment. It will be appreciated that the elements of FIG. 2B are similar to the elements of FIG. 2A, except as discussed below.

As shown in FIG. 2B, the system 200 can include an AC/DC/DC converter 260. It will be appreciated that the AC load 225 can include the AC/DC/DC converter 260. The system 200 can also include a DC evaporator fan 265 and/or a DC condenser fan 270. The DC power from the energy storage 250, the energy network 245, and/or the generator 240 can drive the DC evaporator fan 265 and/or the DC condenser fan 270.

In one embodiment, the AC/DC/DC converter 260 can include an AC to DC converter (not shown). The AC to DC converter can convert the AC power from the utility power (not shown) or from the transformer 230 to a DC voltage. The AC/DC/DC converter 260 can also include a DC to DC converter (not shown). The DC to DC converter can be a DC to DC buck converter that converts the DC voltage from the AC to DC converter down to a lower DC voltage. The lower DC voltage from the DC to DC buck converter can drive the DC evaporator fan 265 and/or the DC condenser fan 270.

In another embodiment, the AC/DC/DC converter 260 can include an AC to DC to DC buck converter (not shown). The AC to DC to DC buck converter can convert the AC power from the utility power (not shown) or from the transformer 230 to a DC voltage and then convert the DC voltage down to a lower DC voltage. The lower DC voltage can drive the DC evaporator fan 265 and/or the DC condenser fan 270.

Figure 2C:
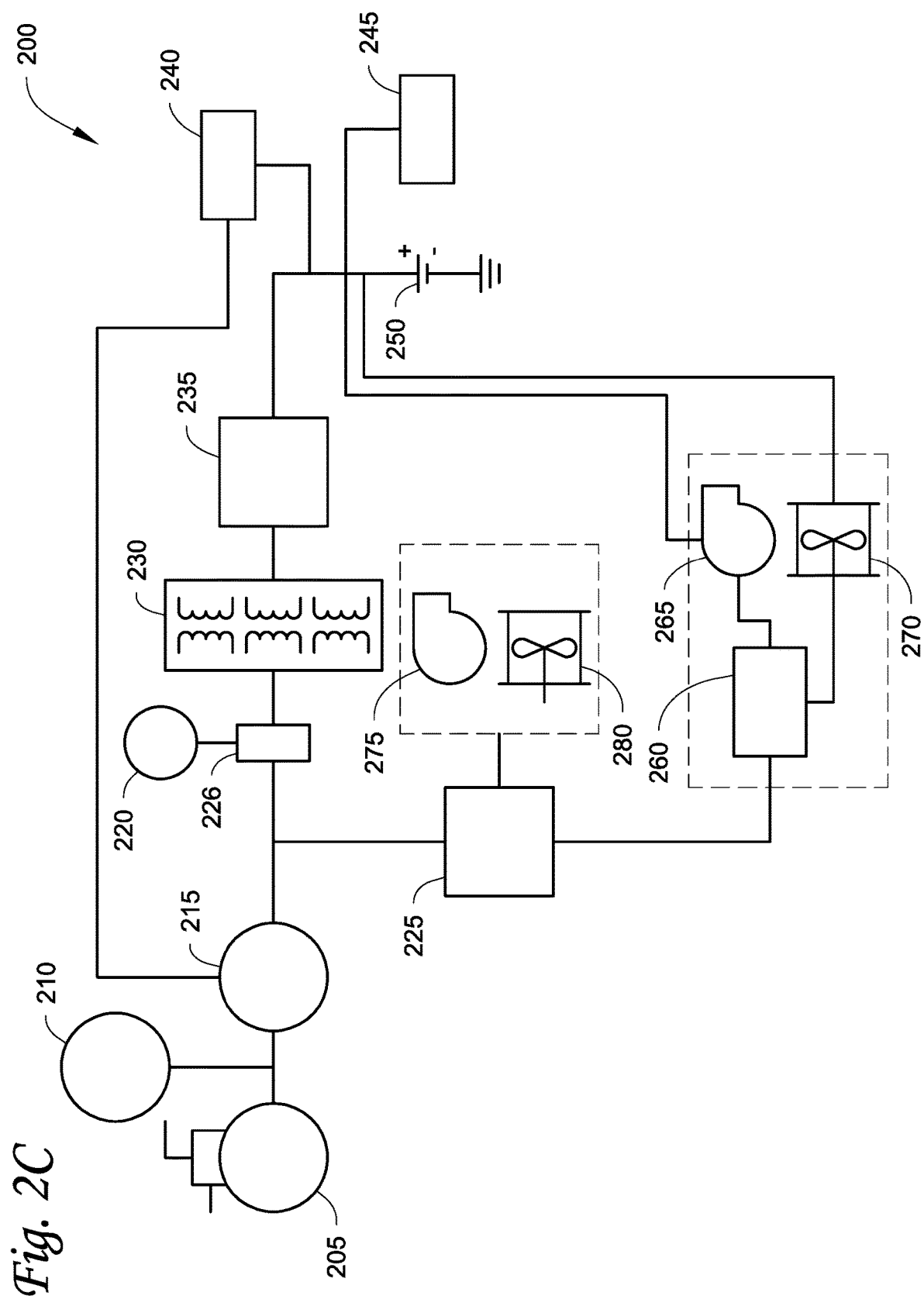
FIG. 2C illustrates a mild hybrid system for powering a transport climate control system, according to yet another embodiment.

FIG. 2C illustrates a mild hybrid system 200 for powering a transport climate control system, according to yet another embodiment. It will be appreciated that the elements of FIG. 2C are similar to the elements of FIGS. 2A and 2B, except as discussed below.

As shown in FIG. 2C, the motor 215 can extract excess power from the prime mover 210, using for example, an inverter (not shown), to drive the generator 240. The generator 240 can be configured to charge the energy storage 250. It will be appreciated that the power generated from the generator 240 can also be used to drive the loads 225 and/or the compressor 205, as described in FIGS. 2A and 2B. It will be appreciated that there can be excess power capacity with the prime mover 210 when the prime mover 210 is running, and there can be a ban on running the prime mover 210 in certain scenarios (e.g., in city areas). In addition, there can be instances where adding additional load on the prime mover 210 can lead to a marginal increase in fuel usage and/or emissions. As such, when the prime mover 210 is running, the excess power can be taken and stored in, for example, the energy storage 250, so that when the vehicle drives into city areas, there can be power available from an emission free source (such as the energy storage 250).

FIG. 3 is a flow chart illustrating a method 300 for managing a mild hybrid system that powers a transport temperature control system, according to one embodiment.

As shown in FIG. 3, the method begins at 310 whereby a device (such as the inverter 235 of FIGS. 2A, 2B, and 2C) converts a DC voltage (e.g., 24V, 48V, 88V, 120V, 200V, etc.) from a DC energy source (such as the energy storage 250 of FIGS. 2A, 2B and 2C) to a first AC voltage (e.g., AC voltage that corresponding to the DC voltage). It will be appreciated that corresponding to the DC voltage to be converted (i.e., the VDC) via the inverter, the converted AC voltage can be at or about VDC/sqrt(2). For example, the converted AC voltage corresponding to a 24 VDC is at or about $24/2^{1/2}$ VAC, the converted AC voltage corresponding to a 48 VDC is at or about $48/2^{1/2}$ VAC, etc. It will further be appreciated that at 310, a DC load can be driven by the first DC voltage. The DC load can be a DC evaporator fan, a DC condenser fan, etc. The method proceeds to 320.

At 320, a transformer (such as the transformer 230 of FIGS. 2A, 2B, and 2C) converts the first AC voltage to a second AC voltage (e.g., 230 VAC, 460 VAC, etc.). The second AC voltage matches the voltage requirements of, for example, the motor 215 and/or the AC load 225 of FIGS. 2A and 2B. The second AC voltage is greater than the first AC voltage. The method proceeds to 330.

At 330, a load (such as the motor 215 of FIGS. 2A, 2B, and 2C, etc.) connected to the transformer is driven by the second AC voltage. It will be appreciated that at 330, an AC load (such as the AC load 225 of FIGS. 2A, 2B, and 2C) connected to the transformer can be driven by the second AC voltage. The AC load can be, for example, an AC evaporator fan, an AC condenser fan, etc. Also, it will be appreciated that in one embodiment at 330, an AC to DC converter can convert the second AC voltage to a second DC voltage. Then a DC to DC buck converter can convert the second DC voltage down to a third DC voltage (e.g., 24V, 48V, 88V, 120V, 200V, etc.). It will also be appreciated that in another embodiment at 330, an AC to DC to DC buck converter can convert the second AC voltage down to a lower DC voltage (e.g., 24V, 48V, 88V, 120V, 200V, etc.). It will be appreciated that the first DC voltage can be equal to the lower third DC voltage. The method proceeds to 340.

At 340, the load (such as the motor 215 of FIGS. 2A, 2B, and 2C, or a fan, etc.) drives a device (such as the compressor 205 of FIGS. 2A and 2B) of the transport climate control system. It will be appreciated that at 340, a DC load can be driven by the third/lower DC voltage. The DC load can be, for example, a DC evaporator fan, a DC condenser fan, etc.

Aspects

It is appreciated that any of aspects 1-9 and 10-18 can be combined.

Aspect 1. A mild hybrid system for powering a transport climate control system, comprising:
- a DC energy source configured to supply a first DC voltage to the transport climate control system;
- an inverter connected to the DC energy source and configured to change the first DC voltage from the DC energy source to a first AC voltage;
- a transformer connected to the inverter and configured to convert the first AC voltage to a second AC voltage; and
- a motor connected to the transformer and configured to drive a compressor of the transport climate control system,
- wherein the motor is driven by the second AC voltage, the second AC voltage is greater than the first AC voltage.

Aspect 2. The system of aspect 1, further comprising:
- an AC load connected to the transformer,
- wherein the AC load is driven by the second AC voltage, and the AC load is one or more of an AC evaporator fan and an AC condenser fan.

Aspect 3. The system of aspect 1, further comprising:
- an AC to DC converter;
- a DC to DC buck converter; and
- a DC load,
- wherein the AC to DC converter converts the second AC voltage to a second DC voltage, the DC to DC buck converter converts the second DC voltage down to a third DC voltage.

Aspect 4. The system of aspect 1, further comprising:
- an AC to DC to DC buck converter connected to the transformer; and
- a DC load connected to the AC to DC to DC buck converter,
- wherein the AC to DC to DC buck converter converts the second AC voltage down to a second DC voltage supplied to the DC load.

Aspect 5. The system of aspect 4, wherein the second DC voltage drives the DC load, the DC load is one or more of a DC evaporator fan and a DC condenser fan.

Aspect 6. The system of aspect 4, wherein the first DC voltage drives the DC load, the DC load is one or more of a DC evaporator fan and a DC condenser fan, and the first DC voltage is equal to the second DC voltage.

Aspect 7. The system of any one of aspects 1-6, wherein the first DC voltage is 48V.

Aspect 8. The system of any one of aspects 1-7, wherein the second AC voltage is at least one of 230V and 460V.

Aspect 9. The system of any one of aspects 1-8, wherein the motor is driven by one of a 230V AC and a 460V AC.

Aspect 10. A method for managing a mild hybrid system that powers a transport temperature control system, the method comprising:
- converting, by an inverter, a DC voltage from a DC energy source to a first AC voltage;
- converting, by a transformer, the first AC voltage to a second AC voltage, the second AC voltage being greater than the first AC voltage;
- driving a motor by the second AC voltage; and
- driving a compressor of the transport climate control system by the motor.

Aspect 11. The method of aspect 10, further comprising:
- driving an AC load by the second AC voltage,
- wherein the AC load is at least one of an AC evaporator fan and an AC condenser fan.

Aspect 12. The method of aspect 10, further comprising:
- converting, via an AC to DC converter, the second AC voltage to a second DC voltage, and
- converting, via a DC to DC buck converter, the second DC voltage down to a third DC voltage.

Aspect 13. The method of aspect 10, further comprising:
- converting, via an AC to DC to DC buck converter, the second AC voltage down to a second DC voltage.

Aspect 14. The method of aspect 13, further comprising:
- driving a DC load by the second DC voltage, wherein the DC load is at least one of a DC evaporator fan and a DC condenser fan.

Aspect 15. The method of aspect 13, further comprising:
- driving a DC load by the first DC voltage,
- wherein the DC load is at least one of a DC evaporator fan and a DC condenser fan, and the first DC voltage is equal to the second DC voltage.

Aspect 16. The method of any one of aspects 10-15, wherein the first DC voltage is 48V.

Aspect 17. The method of any one of aspects 10-16, wherein the second AC voltage is one of 230V and 460V.

Aspect 18. The method of any one of aspects 10-17, wherein the motor is driven by one of a 230V AC and a 460V AC.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:
1. A mild hybrid system for powering a transport climate control system, comprising:
- a DC energy source configured to supply a first DC voltage to the transport climate control system;
- an inverter connected to the DC energy source and configured to change the first DC voltage from the DC energy source to a first AC voltage;
- a transformer connected to the inverter and configured to convert the first AC voltage to a second AC voltage;
- a motor connected to the transformer and configured to drive a compressor of the transport climate control system;
- an AC to DC converter;
- a DC to DC buck converter; and
- a DC load,
- wherein the motor is driven by the second AC voltage, the second AC voltage is greater than the first AC voltage,
- wherein the AC to DC converter converts the second AC voltage to a second DC voltage, the DC to DC buck converter converts the second DC voltage down to a third DC voltage.

2. The system of claim 1, further comprising:
an AC load connected to the transformer,
wherein the AC load is driven by the second AC voltage, and the AC load is one or more of an AC evaporator fan and an AC condenser fan.

3. The system of claim 1, wherein the first DC voltage is 48V.

4. The system of claim 1, wherein the second AC voltage is at least one of 230V and 460V.

5. The system of claim 1, wherein the motor is driven by one of a 230V AC and a 460V AC.

6. A mild hybrid system for powering a transport climate control system, comprising:
a DC energy source configured to supply a first DC voltage to the transport climate control system;
an inverter connected to the DC energy source and configured to change the first DC voltage from the DC energy source to a first AC voltage;
a transformer connected to the inverter and configured to convert the first AC voltage to a second AC voltage;
a motor connected to the transformer and configured to drive a compressor of the transport climate control system;
an AC to DC to DC buck converter connected to the transformer; and
a DC load connected to the AC to DC to DC buck converter,
wherein the motor is driven by the second AC voltage, the second AC voltage is greater than the first AC voltage,
wherein the AC to DC to DC buck converter converts the second AC voltage down to a second DC voltage supplied to the DC load.

7. The system of claim 6, wherein the second DC voltage drives the DC load, the DC load is one or more of a DC evaporator fan and a DC condenser fan.

8. The system of claim 6, wherein the first DC voltage drives the DC load, the DC load is one or more of a DC evaporator fan and a DC condenser fan, and the first DC voltage is equal to the second DC voltage.

9. A method for managing a mild hybrid system that powers a transport temperature control system, the method comprising:
converting, by an inverter, a DC voltage from a DC energy source to a first AC voltage;
converting, by a transformer, the first AC voltage to a second AC voltage, the second AC voltage being greater than the first AC voltage;
driving a motor by the second AC voltage;
driving a compressor of the transport climate control system by the motor,
converting, via an AC to DC to DC buck converter, the second AC voltage down to a second DC voltage.

10. The method of claim 9, further comprising:
driving an AC load by the second AC voltage,
wherein the AC load is at least one of an AC evaporator fan and an AC condenser fan.

11. The method of claim 9, further comprising:
driving a DC load by the second DC voltage,
wherein the DC load is at least one of a DC evaporator fan and a DC condenser fan.

12. The method of claim 9, further comprising:
driving a DC load by the first DC voltage,
wherein the DC load is at least one of a DC evaporator fan and a DC condenser fan, and the first DC voltage is equal to the second DC voltage.

13. The method of claim 9, wherein the first DC voltage is 48V.

14. The method of claim 9, wherein the second AC voltage is one of 230V and 460V.

15. The method of claim 9, wherein the motor is driven by one of a 230V AC and a 460V AC.

* * * * *